United States Patent

Guery

[15] 3,663,818
[45] May 16, 1972

[54] METHOD AND APPARATUS FOR DETERMINATION OF A HIGHLY ACTIVE ELEMENT BY ALPHA PARTICLE

[72] Inventor: Marcel Guery, Orsay, France
[73] Assignee: Commissariat A L' Energie Atomique, Paris, France
[22] Filed: Dec. 30, 1969
[21] Appl. No.: 889,156
[30] Foreign Application Priority Data
    Jan. 14, 1969    France..................................6900457
[52] U.S. Cl.........................250/106 SC, 250/83 R, 250/105
[51] Int. Cl..............................................................G01t 1/00
[58] Field of Search ...........250/83 R, 106 S, 106 SC, 71.5 R, 250/105

[56] References Cited

UNITED STATES PATENTS 3,114,040  12/1963  Zaborowski......................250/71.5 R
3,493,749  2/1970  Olson..............................250/106 SC
3,511,994  5/1970  Jonsson et al........................250/83 R

*Primary Examiner*—James W. Lawrence
*Assistant Examiner*—Davis L. Willis
*Attorney*—Cameron, Kerkam & Sutton

[57] ABSTRACT

A method of determination of an element having high alpha activity and diluted in a substance having low alpha activity by alpha particle spectrometry of a source having a thickness at least equal to the path of the alpha particles which provide a spectral curve or so-called degraded spectrum having a practically rectilinear portion, wherein said method consists in determining the quantity of said high-alpha activity element contained in said source by measuring the area of one section of the degraded spectrum which is comprised between two fixed energies located between the limits of said rectilinear portion, said area after subtraction of the background and the contribution of the substance which has a low alpha activity being proportional to the content to be determined.

2 Claims, 4 Drawing Figures

METHOD AND APPARATUS FOR DETERMINATION OF A HIGHLY ACTIVE ELEMENT BY ALPHA PARTICLE

This invention relates to a method entailing the use of alpha particle spectrometry of a thick source for determination of an element having high alpha activity which is diluted in a substance having low alpha activity and in particular plutonium contained in a uranium-plutonium alloy.

The invention is also concerned with an apparatus for carrying said method.

A known method of determination of an element having high alpha activity consists in having recourse to chemical analysis in conjunction with mass spectrometry; accuracy of the determination thus obtained is satisfactory but the analyses are time-consuming.

Another known method is based on alpha particle spectrometry of a thin source which is prepared from a solution of the sample to be determined. However, many difficulties are attached to this mode of determination since it in fact entails the preparation of a thin coating (of the order of 10 to 50 $\mu/cm^-$) which is wholly representative of the sample. A coating of this thickness has only a low level of activity, is consequently highly sensitive to contamination and results in poor statistical accuracy; moreover, it is difficult to have a reference value, namely the mass of the coating or the activity of a characteristic spectral line of the most abundant substance.

The energy spectra of alpha particle emitting substances in the thin source state are made up of thin lines. If the thickness of the source is increased, the lines increase in width and overlap and measurements are not readily usable. When the thickness of the source is at least equal to the path of the alpha particles, there is obtained an indistinct spectral curve referred-to as a thick source spectrum or degraded spectrum. The thick source is nevertheless attended by a number of different advantages: the useful thickness is constant and a quantitative comparison between samples accordingly becomes possible; since the analysis is carried out in a solid sample, there is no need to prepare a coating and the measurements are non-destructive; in respect of the same surface area under analysis and at the same solid angle, the count rates are at least several hundred times higher than in the case of thin sources (line spectra) since the thickness of material which is subjected to the measurement is relatively very substantial and close to the alpha particle range. This results in excellent statistical accuracy and practically zero sensitivity to accidental contamination of equipment.

The present invention relates to a method of determination of an element having high alpha activity and diluted in a substance having low alpha activity by alpha particle spectrometry of a source having a thickness at least equal to the path of the alpha particles which provide a spectral curve or so-called degraded spectrum formed by the superposition of a plurality of spectra and having a practically rectilinear portion. The method essentially consists in determining the quantity of said high-alpha-activity element contained in said source by measuring the area of one section of the degraded spectrum which is comprised between two fixed energies located between the limits of said rectilinear portion, said area after subtraction of the background and the contribution of the substance which has a low alpha activity being proportional to the content to be determined.

The invention is also directed to an alpha particle counting apparatus which serves to carry out said method and comprises a turntable for receiving a sample which contains a high-alpha-activity element to be determined, and a casing fitted with an alpha particle detector, the assembly consisting of said turntable and said casing being placed within a bell-housing under a primary vacuum and capable of rotating about a shaft. Said apparatus is essentially distinguished by the fact that said casing forms a collimator between the detector and the sample and is adapted to carry laterally and outside the cone of circulation of alpha particles emitted by the sample a thin source consisting of an alpha emitter having an emission line whose energy is higher than the energy levels of the alpha lines emitted by the sample and serves to stabilize the degraded spectrum of said sample by means of a digital stabilizer.

Further properties and advantages of the present invention will be brought out by the following description in which one embodiment of the invention is given by way of explanation and not in any limiting sense, reference being had to the accompanying drawings, wherein:

FIGS. 1 and 2 show on each spectral curve a practically rectilinear portion which is slightly inclined with respect to the axis of abscissae.

Figure 1:
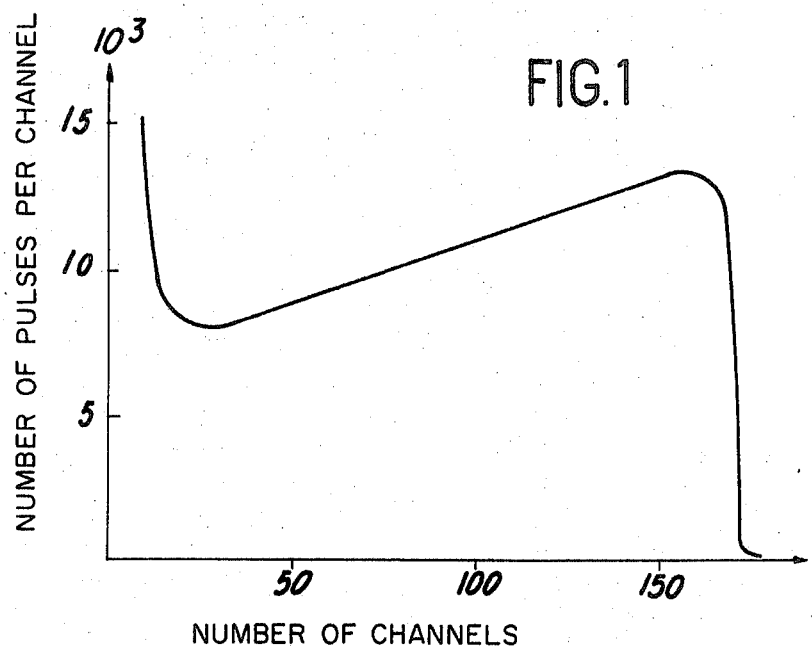
FIG. 1 shows the general shape of a thick source spectrum, wherein the axis of abscissae bears the numbers of the channels over which the spectrum extends and the axis of ordinates corresponds to the number of pulses per channel.
Figure 2:
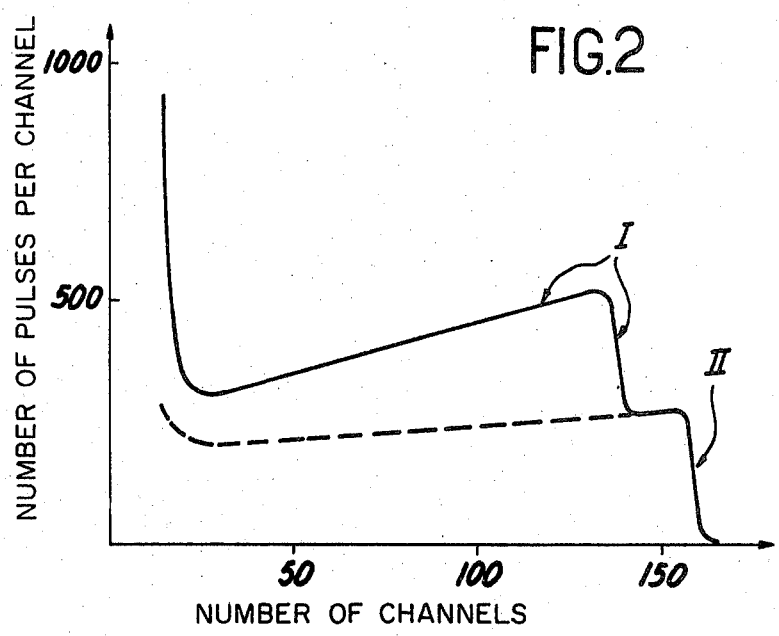
FIG. 2 shows the spectrum of a thick source of natural uranium; the spectral curve is the juxtaposition of two degraded spectra having different maximum energies (spectrum of U-238 and spectrum of U-234); in this case also, the axis of abscissae bears the numbers of the channels and the axis of ordinates corresponds to the number of pulses per channel.

In FIG. 2, portion I of the curve corresponds to U-238 and portion II corresponds to U-234.

Figure 3:
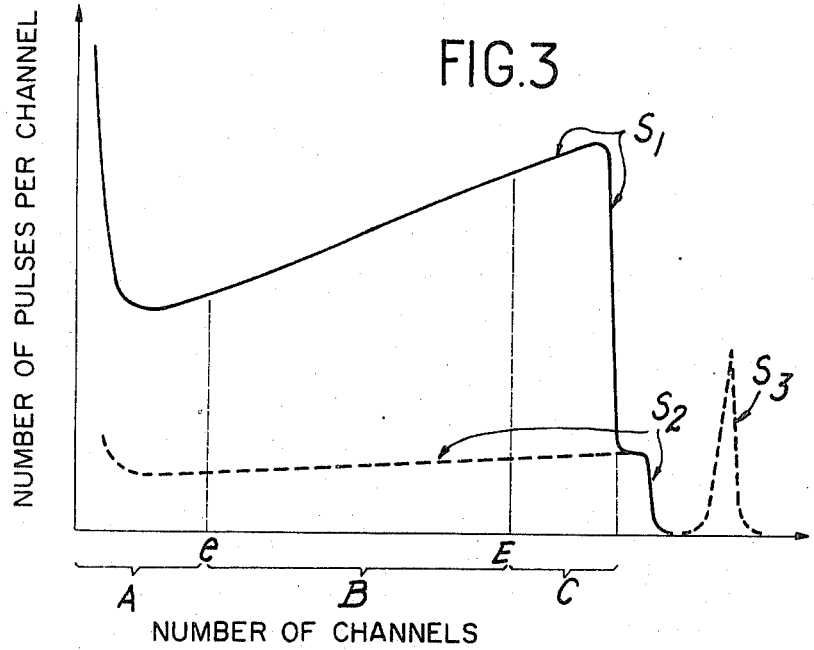
FIG. 3 shows the degraded spectrum of a uranium-plutonium alloy; the energies are plotted as abscissae and the number of pulses per unit of energy are plotted as ordinates; and finally.

FIG. 3 corresponds to a particularly advantageous application of the invention, namely the determination of the plutonium content of a uranium-plutonium alloy.

The spectral curve of this figure which comprises a practically rectilinear portion as in the previous cases is formed by the juxtaposition of a number of spectra, viz:

a. the spectra which are derived from the alpha particles of uranium, which are not usually visible and which serve only as a correction;

b. the spectrum of the Pu-240 and Pu-239 isotopes (portions $S_1$ of the spectral curve) which both emit alpha particles having a mean energy which is very close to 5.15 MeV;

c. the spectrum of the Pu-238 and Am-241 isotopes (portion $S_2$ of the spectral curve) which both emit alpha particles having a mean energy which is very close to 5.48 MeV.

Finally, the dashed-line portion $S_3$ of the curve represents the spectrum of a thin source of a high-energy alpha emitter (for example curium-244 or californium-256), the function of which will be explained hereinafter.

The area of the degraded spectrum from which is subtracted the contribution of the background radiation of uranium, of Pu-238 and of Am-241 is proportional to the plutonium content of the sample in respect to a given isotopic composition of the plutonium. Should this composition vary, the proportionality constant also changes but can be calculated on the basis of the percentage of Pu-240 contained in the plutonium.

However, it is not possible in practice to take into consideration the total area (A + B + C, FIG. 3) of the degraded spectrum since the background noise of the equipment (zone A in FIG. 3) causes interference and, in addition, the spectrum is impaired by the residual oxidation of the sample, especially at high energy levels. Similarly, it is at high energy levels that the influence of contamination may appear; the contamination is a thin source and therefore produces thin lines or lines exhibiting little degradation and maximum energy (zone C in FIG. 3 is highly sensitive to oxidation and to contamination). There is consequently to be taken into account only the area B of one section of the degraded spectrum which is located between two fixed energies ($e$ and E) which are sufficiently distant from zero and from the maximum energy. The section which is thus measured is equal to approximately one-half the total area.

Figure 4:
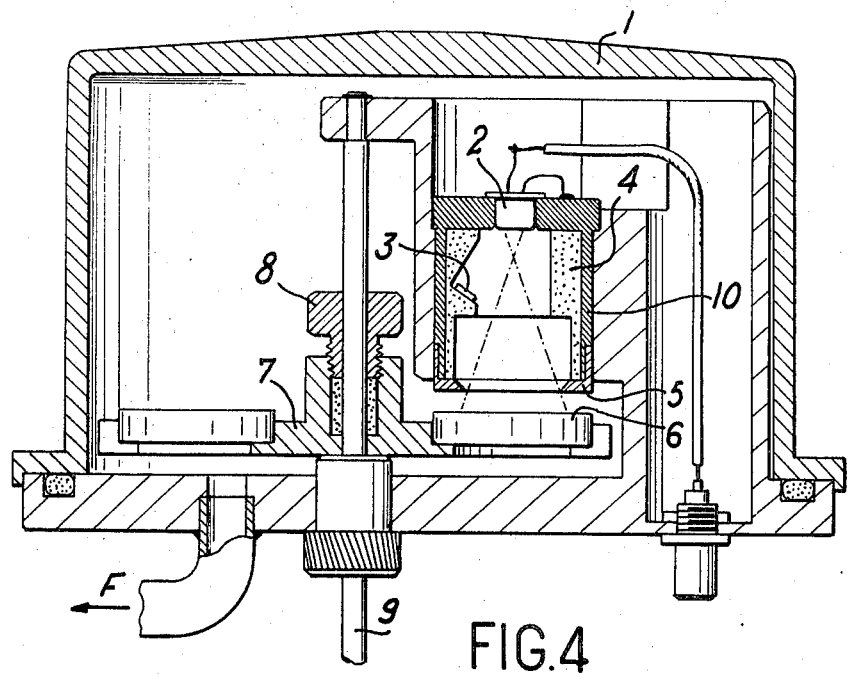
FIG. 4 is a sectional view of an alpha particle counting apparatus in accordance with the invention.

The alpha particle counting apparatus in accordance with the present invention and as illustrated in FIG. 4 operates as follows.

The measurements are carried out under a bell-housing 1 in which is produced a primary vacuum (arrow F) in order not to slow down the alpha particles.

The alpha particle detector 2 is a silicon diode of the junction or surface barrier type (known as a "semictor"). The diode is placed at the bottom of a cylindrical casing 10, the other open end of which forms a collimator 5.

The sample 6 to be measured is not wholly "seen" by the diode 2 owing to the presence of the collimator 5. Accordingly, the position of the sample 6 is not critical: if the distance to the diode is modified to a slight extent, the count rate will not change inasmuch as the variations in surface area of sample as seen by the diode exactly compensate for the variations in the mean solid angle at which the diode is seen from said sample.

A thin source 3 consisting of a high-energy alpha emitter such as curium–244 or californium–256 is placed inside the collimator casing and outside the cone of circulation of alpha particles emitted by the sample 6. This source produces an alpha line which stands out from the degraded spectrum of the sample (dashed-line portion $S_3$ of the spectral curve shown in FIG. 3). A digital stabilizer is set on this line and has the intended function of compensating for all the variations in gain of the measuring circuit. A second stabilization prevents drift of the origin of energies. Thus, the energies which are selected as limits of the section of the spectrum are fixed with respect to the spectrum. The reference numeral 4 designates an anti-scattering packing.

The samples 6 to be measured are cleaned with sandpaper in order to remove the oxidation which impairs the spectrum and are then placed in a turntable 7, the rotation of which is controlled by the amplitude analyzer itself (by means of a mechanism which is not illustrated). The reference numeral 8 designates a system for locking said turntable on its shaft 9.

The correction of the uranium contribution is either measured directly by passing a uranium sample or calculated.

The correction of the contribution of the Pu–238 and Am–241 isotopes (portion $S_2$ of the spectral curve shown in FIG. 3) can be calculated from that portion of their degraded spectrum which has the highest energy and which appears beyond the spectrum of the plutonium-239 and -240 isotopes.

Calibration of the apparatus is carried out from samples whose composition is wholly and accurately known by other methods.

Once the apparatus is calibrated, the precision obtainable in the measurement of the plutonium content is higher than 0.5 percent (the concentration of Pu–240 in the plutonium being known).

Conversely, if the total quantity of plutonium contained in the alloy were known, it would be possible by this method to fine the quantity of Pu-240 which is present in the plutonium.

More generally, if a count depends on the concentration and relative abundance of an isotope, alpha particle spectrometry of thick sources makes it possible to deduce one value from a knowledge of the other by comparison with a reference standard in which both values are known.

What I claim is:

1. In an alpha particle counting apparatus having a turntable for receiving a sample which contains a high-alpha-activity element to be determined, a casing fitted within an alpha particle detector, said turntable and said casing being placed within a bell-housing under a primary vacuum, said turntable rotating about a shaft, the improvement in which said casing is a collimator between the detector and the sample and a thin source in said casing is located laterally outside the cone of circulation of alpha particles emitted by the sample said thin source consisting of an alpha emitter having an emission line whose energy is higher than the energy levels of the alpha lines emitted by the sample, said thin source stabilizing the degraded spectrum of said sample.

2. An alpha-ray counting apparatus in accordance with claim 1, wherein said alpha particle detector is a diode and the measurement is independent of the distance from the sample to the measurement diode.

* * * * *